Dec. 27, 1927.

E. J. ARMSTRONG 1,653,832

SPROCKET CHAIN LINK

Filed Sept. 19, 1922

Inventor
Edwin J. Armstrong
by
Attorney

Patented Dec. 27, 1927.

1,653,832

UNITED STATES PATENT OFFICE.

EDWIN J. ARMSTRONG, OF ERIE, PENNSYLVANIA, ASSIGNOR, BY MESNE ASSIGNMENTS, TO ERIE STEAM SHOVEL COMPANY, OF ERIE, PENNSYLVANIA, A CORPORATION OF PENNSYLVANIA.

SPROCKET-CHAIN LINK.

Application filed September 19, 1922. Serial No. 589,053.

Difficulty has been experienced in lubricating chains and the like, particularly chains which form continuous tracks for tractors and similar devices. Such tracks present a great number of joints so that if the frequent renewal of the lubricant is necessary a great amount of labor is involved. The present invention is designed to supply lubricant to a chain or like device for a considerable period without renewal.

In carrying out the invention a chamber for lubricant is provided in cavities arranged in the links and passages lead from these chambers to the joint. The point of exit or passage from the chamber being located at an intermediate point in the chamber the chain will receive lubricant only in small amounts as the chain is reversed. Even with such a passage an excess of lubricant is carried to the joint and consequently the period which can be covered by one filling of the cavity is shortened. To still further reduce the delivery of lubricant to the joint the passage is specially formed so that only a small portion of the lubricant which enters the passage with each revolution of the chain is carried to the bearing. Further it is desirable to limit the application of lubricant to the lower run of the chain and in the construction here shown this is accomplished.

The invention is illustrated in the accompanying drawings as follows:—

Figure 1:
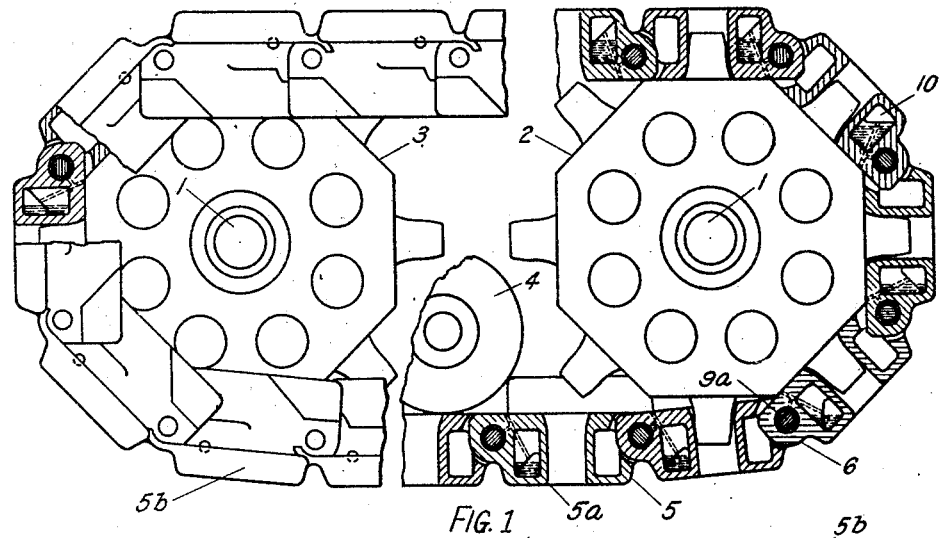

Fig. 1 shows a side elevation of a chain, partly in section, in place carried by sprockets of usual construction.

Figure 2:
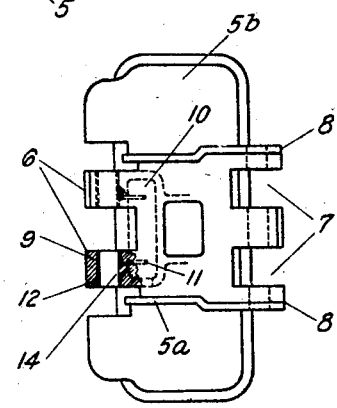

Fig. 2 a plan view of the back side of a chain link.

Figure 3:
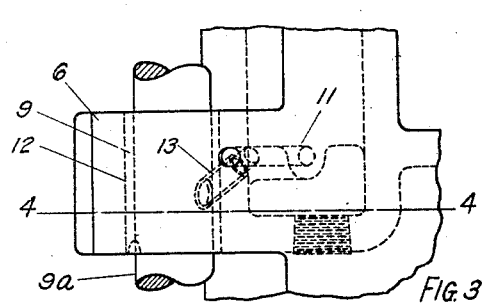

Fig. 3 an enlarged view of one of the knuckles of the link.

Figure 4:
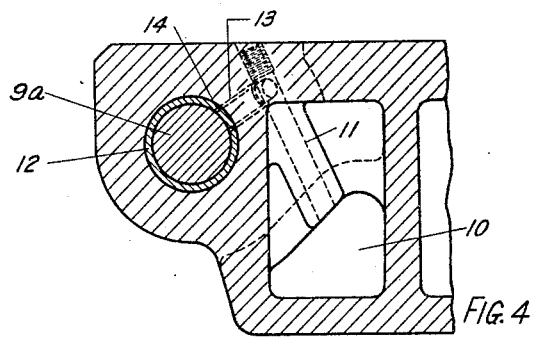

Fig. 4 a section on the line 4—4 in Fig. 3.

1 marks the axles of a tractor which as shown is taken from a tractor of a steam shovel, 2 a driving sprocket, 3 an idler, and 4 one of the supporting rollers for a track 5. The track is made up of links $5^a$ having supporting plates $5^b$ and openings for receiving the sprocket teeth. Each link is provided with knuckle projections 6 which are adapted to extend into the spaces 7 between the knuckle projections 8 of the next succeeding link. The knuckles 6 are provided with bearings 9 and pins $9^a$ extend through the bearings 9 being preferably fixed in the knuckles 8. Each link preferably has a cavity 10 adjacent to the bearing 9 and between the bearing or pin opening and the sprocket tooth opening. A passage 11 extends into the cavity or chamber 10 having its exit from the chamber 10 at an intermediate position in the chamber so that as the chamber is revolved with the chain the lubricant at no time directly covers the opening to the passage 11. As shown there are two of these passages leading from the cavity one to each of the knuckles 6.

Even with the opening to the passage located as described an excess of lubricant is delivered to the passage and to the joint and in consequence the period which the joint can be lubricated from one charging of the cavity is restricted. In order to prolong this period I prefer to form different parts of the passage at an angle to each other, a part adjacent to the chamber 10 and a part adjacent to the pin opening or bearing 6. A small quantity of lubricant, therefore, is taken into the entrance part of the passage 11 as it is swung upright in the revolution of the chain, moves down this passage, but is arrested when it reaches the turn in the passage. When the link is again reversed the small portion of the lubricant thus brought to the turn moves down the branch of the passage leading to the bearing and the remainder of the lubricant drains down the portion of the passage back to the chamber. In this way there is a positive and assured feeding of lubricant but in a minute quantity.

It will be noted that the turn in the passage along the upper run of the chain is at the bottom of the passage and the branch leading to the bearing has an upward inclination so that lubricant is not delivered to the chain along the upper run but is confined largely, if not entirely, to the lower run of the chain. This is desirable because the connection being under strain the pins are offset from the walls of the bearing to the greatest possible extent and thus permit of an axial movement of the lubricant.

I prefer to provide the bearing with a bushing 12. A tube 13 is driven through an opening 14 in this bushing into the passage 11 and thus locks the bushing 12 against turning so as to move the opening 14 out of register with the passage 11.

It will be noted that with the medial position of the point of entrance of the passage to the opening and a proper shaping of the cavity an approximately constant level of liquid relative to the point of entrance of the passage to the cavity is maintained throughout the turning movement of the link. This gives to the cavity the largest possible capacity without at any time covering the point of entrance, in as much as the cavity may be filled nearly half full of lubricant at each filling without overflowing the point of entrance to the passage with any position of the link.

What I claim as new is:—

1. A sprocket chain link having a pin opening, a cavity for retaining a lubricant, and a passage in said link leading from the cavity to the opening, said passage being adapted to convey liquid from the cavity to the opening by gravity upon the rotation of the link, said passage leading downward adjacent to the opening and delivering lubricant thereto when the link is in a lower run of a chain.

2. A sprocket chain link having a pin opening, a cavity for retaining a lubricant, and a passage leading from the cavity to the pin opening, said passage being adapted to convey liquid from the cavity to the opening by gravity upon the rotation of the link, the part of the passage adjacent to the opening being at an angle to and forming a return bend relatively to the part of the passage adjacent to the cavity, one leg of the return bend extending upwardly from the bend as the other leg extends downwardly from the bend.

3. A sprocket chain link having a pin opening, a cavity for retaining a lubricant, and a passage leading from the cavity to the pin opening, the part of the passage adjacent to the opening being at an angle to the part of the passage adjacent to the cavity and the part adjacent to the opening inclined downward to the opening with the link in a lower run of a chain.

4. A sprocket chain link having a pin opening, a cavity for retaining a lubricant, and a passage leading from a medial point in the cavity in a plane at right angles to the pin opening, said passage leading downward adjacent to the opening when the link is in a lower run of a chain.

5. A sprocket chain link having a pin opening, a cavity for retaining a lubricant, and a passage leading from a medial point in the cavity in a plane at right angles to the pin opening, the part of the passage adjacent to the opening being at an angle to the part of the passage adjacent to the cavity.

6. A sprocket chain link having a pin opening, a cavity for retaining a lubricant, and a passage leading from a medial point in the cavity to the pin opening, the part of the passage adjacent to the opening being at an angle to the part of the passage adjacent to the cavity and the part adjacent to the opening inclined downward to the opening with the link in a lower run of a chain.

7. A sprocket chain link having a pin opening, a cavity for lubricant, and a passage leading from the cavity to the pin opening, a bushing for the pin opening having an opening therethrough, and a tube extending through the opening in the bushing into the passage, said tube locking the bushing against turning and maintaining communication between the opening and the passage.

8. A chain link having a plurality of knuckle projections with a pin opening therethrough, a cavity for retaining a lubricant, and a passage leading from the cavity to the pin opening in each knuckle projection, the passages having a part leading from the cavity at an angle to the part adjacent to the opening, said passage forming a return bend with one leg of the bend extending upwardly as the other leg of the bend extends downwardly.

9. A chain link having a plurality of knuckle projections with a pin opening therethrough, a cavity for retaining a lubricant, and a passage leading from the cavity to the pin opening in each knuckle projection, the passages having a part leading from the cavity at an angle to the part adjacent to the opening, with the part adjacent to the opening inclined downwardly with the link in a lower run of a chain, said passage forming a return bend with one leg of the bend extending downwardly as the other leg of the bend extends upwardly.

In testimony whereof I have hereunto set my hand.

EDWIN J. ARMSTRONG.